United States Patent [19]

Crespo Ruiz et al.

[11] Patent Number: 4,761,051
[45] Date of Patent: Aug. 2, 1988

[54] LONGITUDINAL SEALING DEVICE FOR AN OPTICAL CABLE CORE

[75] Inventors: François Crespo Ruiz, Paris; André Pelet, Maurepas, both of France

[73] Assignee: Alcatel Cit, Paris, France

[21] Appl. No.: 21,044

[22] Filed: Mar. 2, 1987

[30] Foreign Application Priority Data

Feb. 28, 1986 [FR] France ................... 86 02810

[51] Int. Cl.[4] ............... G02B 6/36; H02G 3/00
[52] U.S. Cl. ............... 350/96.20; 350/96.22; 350/96.23; 174/70 R
[58] Field of Search ........... 350/96.20, 96.21, 96.22, 350/96.23, 96.24; 174/70 S, 70 R; 264/1.1, 1.5, 1.6, 1.7

[56] References Cited

U.S. PATENT DOCUMENTS

| | | | |
|---|---|---|---|
| 3,825,320 | 7/1974 | Redfern | 350/96.20 X |
| 4,073,050 | 2/1978 | Kloots | 350/96.23 X |
| 4,173,389 | 11/1979 | Curtis | 350/96.20 |
| 4,207,428 | 6/1980 | Cosier et al. | 174/70 S |
| 4,262,913 | 4/1981 | Parfree et al. | 277/1 |
| 4,264,128 | 4/1981 | Young | 350/96.20 |
| 4,534,617 | 8/1985 | Kloots et al. | 350/96.20 |
| 4,545,645 | 10/1985 | Mignien | 350/96.21 |
| 4,634,214 | 1/1987 | Cannon, Jr. et al. | 350/96.20 |
| 4,697,870 | 10/1987 | Richards | 350/96.20 |
| 4,699,462 | 10/1987 | Jones | 350/96.23 |
| 4,701,014 | 10/1987 | Bonicel | 350/96.20 |
| 4,722,588 | 2/1988 | Priaroggia | 350/96.21 |
| 4,725,117 | 2/1988 | Ellis | 350/96.20 |
| 4,727,237 | 2/1988 | Schantz | 350/96.20 X |

FOREIGN PATENT DOCUMENTS

| | | | |
|---|---|---|---|
| 0057828 | 8/1982 | European Pat. Off. | 350/96.21 |
| 0061243 | 9/1982 | European Pat. Off. | 350/96.21 |
| 2435845 | 9/1979 | France | 350/96.20 |
| 2022284 | 12/1979 | United Kingdom | 350/96.21 |
| 2028013 | 2/1980 | United Kingdom | 174/70 S |

*Primary Examiner*—William L. Sikes
*Assistant Examiner*—Brian M. Healy
*Attorney, Agent, or Firm*—Sughrue, Mion, Zinn, Macpeak, and Seas

[57] ABSTRACT

A longitudinal sealing device for the core of an optical cable formed by a bundle of optical fibers disposed in a tube, said device being placed at a location where the tube has been cut, and comprising: a block of plastic material molded over the optical fibers of the bundle and over the end of one of the tube portions referred to as the first portion; a sleeve threaded over the block of plastic material and fitted over the end of the other tube portion referred to as the second portion to which it is fixed; and a plug threaded over the first tube portion against the block of plastic material and fixed in sealed manner to said first tube portion, and fixed to the sleeve whose opening it closes.

8 Claims, 1 Drawing Sheet

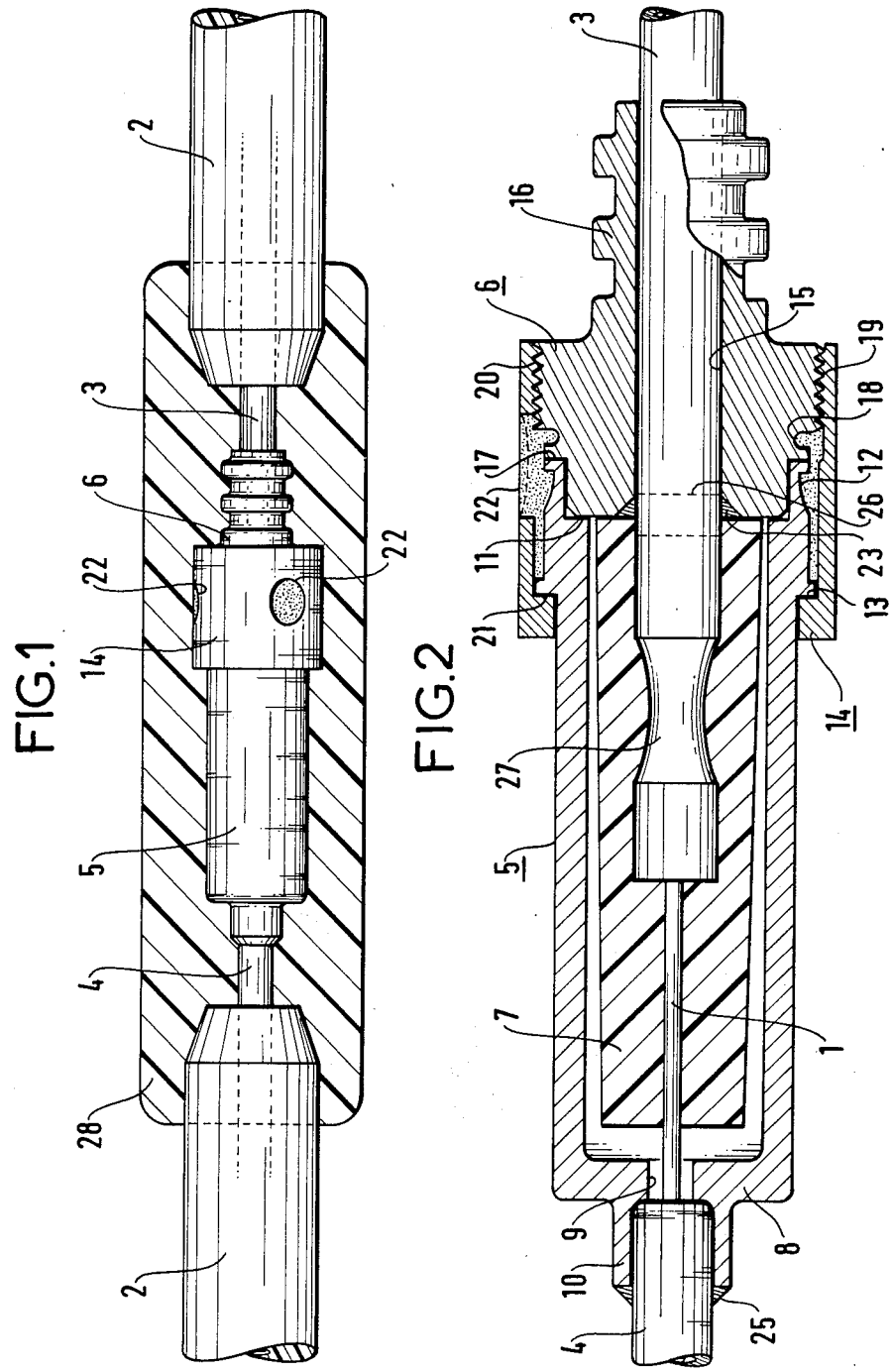

LONGITUDINAL SEALING DEVICE FOR AN OPTICAL CABLE CORE

The present invention relates to a longitudinal sealing device for the core of an optional fiber cable comprising a bundle of optical fibers disposed in a tube.

BACKGROUND OF THE INVENTION

In some applications, including underwater transmission links, it is necessary to provide optical fiber cables which are not only sealed, but which also resist longitudinal propagation of water after water has infiltrated the cable via a damaged portion thereof. Such resistance to longitudinal water propagation is obtained by filling the channels in which the fibers are loosely disposed with a hydrophobic viscous material, and is only effective after a certain length of intact cable.

At the points at which the cable enters repeaters, this technique is inappropriate since there is no guarantee that there will always be a sufficient length of intact cable. One known way of solving this problem is described in French patent application No. 2 435 845 (equivalent to British specification No. 2 030 011 and U.S. Pat. No. 4 262 913) and consists in using a tube through which the bundle of optical fibers in the cable passes at the feed-through in the sealed wall of a repeater housing, this tube is filled with a block of plastic coating material which adheres both to the fibers of the bundle and to the inside wall of the tube, with the tube being fixed in sealed manner through the wall of the repeater housing.

The sealing device obtained in this way suffers from the danger of leaks arising in the long term along the inside wall of the tube since the plastic coating material tends, over a long period of time to shrink somewhat.

Another longitudinal sealing device is known which avoids this drawback and in which the walls of the optical fibers are coated and then embedded in a metal cone insert constituting the central part of a seal. However, this device suffers from the drawback of being difficult to implement without making the optical fibers more brittle.

The aim of the present invention is to mitigate these drawbacks.

SUMMARY OF THE INVENTION

The present invention provides a longitudinal sealing device for the core of an optical cable formed by a bundle of optical fibers disposed in a tube, said device being placed at a location where the tube has been cut, and comprising:

a block of plastic material molded over the optical fibers of the bundle and over the end of one of the tube portions referred to as the first portion;

a sleeve threaded over the block of plastic material and fitted over the end of the other tube portion referred to as the second portion to which it is fixed; and a plug threaded over the first tube portion against the block of plastic material and fixed in sealed manner to said first tube portion, and fixed to the sleeve whose opening it closes.

By virtue of this disposition, the tendency of the block of plastic material to shrink no longer has undesirable effects since the seepage lines which may develop along the inside wall of the end of the first tube portion no longer open out since said end is completely embedded, together with its outside wall, in the block of plastic material, and the shrinking reinforces adherence between the block of plastic material and the outside of the tube. The sleeve and its plug reconstitute the tube outside the block of plastic material and maintain electrical continuity in the event that the tube is made of metal and is used as a conductor.

BRIEF DESCRIPTION OF THE DRAWINGS

An embodiment of the invention is described by way of example, with reference to the accompanying drawing in which:

FIG. 1 is a side view of a sealing device in accordance with the invention and mounted on an optical cable; and FIG. 2 is a longitudinal section view showing details of the internal structure of the FIG. 1 device.

DETAILED DESCRIPTION OF THE INVENTION

The longitudinal sealing device shown in the figures is mounted on an optical cable leader used for passing through the sealed wall of a repeater housing. The corresponding feedthrough is not shown since it does not form part of the invention.

The optical cable leader has a core formed by a bundle of optical fibers 1 placed in a metal tube and surrounded by an insulating sheath 2. At the sealing device, the insulating sheath 2 has been removed and the tube is cut into two portions 3 and 4 in order to reveal a certain length of the bundle of optical fibers 1.

The sealing device itself appears from the outside to be in the form of a sleeve 5 together with its plug 6 interconnecting the two tube portions 3 and 4.

The sleeve 5 envelops a block of plastic coating material 7 which is molded around the optical fibers of the bundle 1 and over the end of the first tube portion 3 which also supports the plug 6. The sleeve is a hollow cylindrical metal part whose end 8 is pierced by an axial hole 9 through which the bundle 1 of optical fibers passes, even though the hole is of smaller diameter than the tube. The walls of the hole 9 extend away from the sleeve in the form of a collar 10 which fits the outside diameter of the tube and which enables the sleeve to be fitted over the end of the second tube portion 4. The inside edge of the open end of the sleeve 5 has a shoulder 11 while its outside edge has a groove 12, thereby delimiting a lip for bonding. The outside diameter of the open end of the sleeve is greater than that of the remainder of the sleeve body and is connected thereto by means of a step 13 which serves as a bearing surface for a ring 14 used for clamping the plug 6.

The plug 6 is a solid cylindrical metal part which fits over the end of the first tube portion 3 by virtue of an axial orifice 15 that fits around the outside diameter of the tube, with the walls of said axial orifice extending away from the plug in the form of a ribbed skirt 16 going away from its face which fits in the sleeve 5, the plug has a profile comprising a circular shoulder 17 limiting the depth to which the plug can be inserted into the sleeve 5, a circular groove 18 which, together with the circular shoulder 17 delimits a bonding lip that comes into contact with the corresponding lip on the sleeve, and an external thread 19 onto which a clamping ring 14 is screwed.

The clamping ring 14 is likewise made of metal and threads over the end of the sleeve 5. The clamping ring fits over the outside diameter of the open end of the sleeve 5 and the plug 6, and it has an internal thread 20 at its edge for engaging the outside thread on the plug 6, and at its other end it has an inwardly directed flange 21 which engages the step 13 on the sleeve 5. The circumference of the ring 14 is pierced by openings 22 level with the bonding lips on the sleeve 5 and on the plug 6 so as to allow an electric welding electrode to pass therethrough and also allowing for visual inspection of the resulting weld which provides electrical continuity between the sleeve 5 and the plug 6.

The above-described device is assembled as follows. Begin with a preparatory step consisting in:

cutting the cable leader prior to inserting the bundle 1 of optical fibers therein, at the future location of the longitudinal sealing device; and removing the sheath from the two resulting ends in order to bare a certain length of said tube.

There follows a first assembly stage consisting in:

threading the plug 6 over a first tube portion 3 and allowing a certain length of tube (about half the length of the sleeve 5) to project therefrom, and bonding the plug 6 in place in sealed manner by means of a fillet of brazing 23 adjacent to the end of said first tube portion;

fitting the sleeve 5 with the clamping ring and fitting the end 8 of the sleeve 5 over the end of the second tube portion, and then bonding it in place with a fillet of brazing 25; and threading the bundle 1 of optical fibers into the portion of the leader which carries the plug.

After this first assembly stage, the plastic coating material 7 is molded by:

placing packing 26 into the end of the tube which carries the plug 6 so as to stop the subsequent progression of plastic coating material at a level corresponding to that of the plug 6;

forming a neck 27 in the outer wall of the tube projecting from the plug 6 in order to facilitate anchoring of the tube in the plastic coating material;

mounting a temporary mold whose inside volume is slightly less than that of the sleeve 5 at the end of the tube which carries the plug 6, said temporary mold may be the same shape as the sleeve 5 and may have an end pierced by filler openings;

pouring in the plastic coating material; and disassembling the mold after the plastic coating material has solidified.

There follows a second assembly step which consists in:

threading the bundle 1 of optical fibers into the portion of the leader which carries the sleeve 5;

fitting the block of plastic coating material 7 inside the sleeve 5;

assembling the sleeve to its plug by means of the clamping ring 14;

bonding the sleeve 5 to the plug 6, e.g. by an electric welding method;

filling in the hollow portions of the clamping ring 14 in order to give it a smooth outside surface more appropriate to being encased; and casting insulating material 28 over the sleeve 5, its plug 6, and the bared portions of tube in order to reestablish continuity of the cable sheath.

When the tube is used as an electrical conductor, electrical continuity is provided by the sleeve and its plug which are conductively bonded together and to the tube.

The leader is provided with transverse sealing at the longitudinal sealing device by means of the insulaltion 28 reconstituting the sheath 2.

The leader is provided with longitudinal sealing along the core at the device by the block of plastic coating material which makes a solid body with the optical fibers of the bundle and with the inside and outside walls of the end of the first tube portion.

Outside the core, longitudinal sealing results from a sufficient contact length between the sheath and the outer wall of the tube or between the encasing insulation and the outer wall of the sleeve and of the plug whose contact length is increased by means of the ribs.

If the plastic coating material 7 shrinks, there will be no ill effect on the quality of the sealing. Even though such shrinking may give rise to interstices along the inside wall of the first tube portion, these interstices are unimportant since the shrinking also reinforces the adherence of the plastic coating material 7 on the outside wall of the first tube portion, thereby preventing said interstices from opening out externally.

The plastic coating material 7 may be an epoxy resin, whereas the encasing insulation and the sheath may be of polyethylene.

It may be observed that the free inside portion of the device may be filled with a hydrophobic substance, for example polyisobutylene, injected via a closable access (not shown) provided for this purpose through the wall of the sleeve and enabling the metal surfaces of the device to be at least partially protected from water should the hydrophobic substance ever be required to act as a sealing barrier.

Various dispositions may be modified and various means replaced by equivalent means without going beyond the scope of the invention.

We claim:

1. A longitudinal sealing device for the core of an optical cable formed by a bundle of optical fibers disposed in a tube, said device being placed at a location where the tube has been cut into two separate first and second tube portions, said device comprising:

a block of plastic material molded over the optical fibers of the bundle and over the end of the first tube portion;

a sleeve placed around the block of plastic material and having one end fitted around the end of the second tube portion and fixed to said second tube portion and having an opening at an opposite end thereof; and a plug placed around the first tube portion against the block of plastic material and fixed in a sealed manner to said first tube portion, and fixed to the sleeve and closing the sleeve opening.

2. A device according to claim 1, wherein the end of the first tube portion embedded in the block of plastic material is necked to facilitate adhesion to the block of plastic material.

3. A device according to claim 1, wherein the sleeve is provided with a clamping ring which screws onto the plug.

4. A device according to claim 1, further including insulation molded over the sleeve and the plug to provide continuity in the transverse sealing obtained on the outside of the device by a cable sheath.

5. A device according to claim 4, wherein the plug placed around the first tube portion has walls defining an orifice through which the tube passes extending outwardly in the form of a ribbed skirt extending the length of contact between the plug and the insulation molded thereover.

6. A device according to claim 1, wherein the sleeve and the plug are provided with circular grooves providing a pair of bonding lips where they come into contact.

7. A device according to claim 1, wherein the tube is made of metal and serves as an electrical conductor, and the sleeve and the plug are metal parts which are conductively bonded together and to the tube so as to provide electrical continuity.

8. A device according to claim 7, wherein the sleeve is provided with a clamping ring which screws onto the plug, and wherein the clamping ring has openings to enable the sleeve to be bonded to the plug and to enable the quality of the bond to be visually inspected.

* * * * *